Nov. 11, 1958  G. S. HARKER  2,859,657
STEREOPTOMETER
Filed Aug. 28, 1956  4 Sheets-Sheet 1
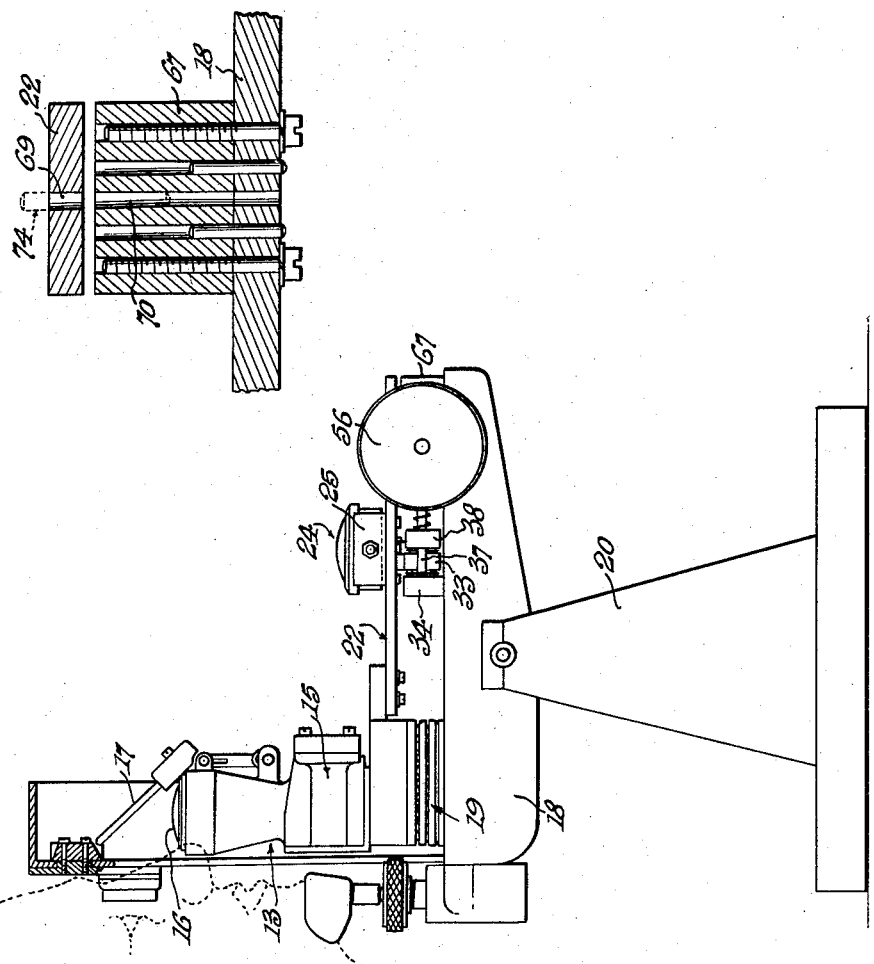
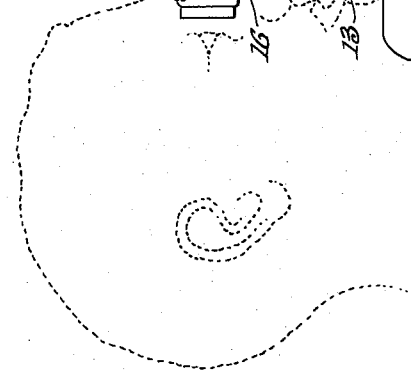
INVENTOR.
George S. Harker
BY
ATTORNEYS Nov. 11, 1958

G. S. HARKER 2,859,657

STEREOPTOMETER

Filed Aug. 28, 1956

INVENTOR.
George S. Harker
BY

ATTORNEYS

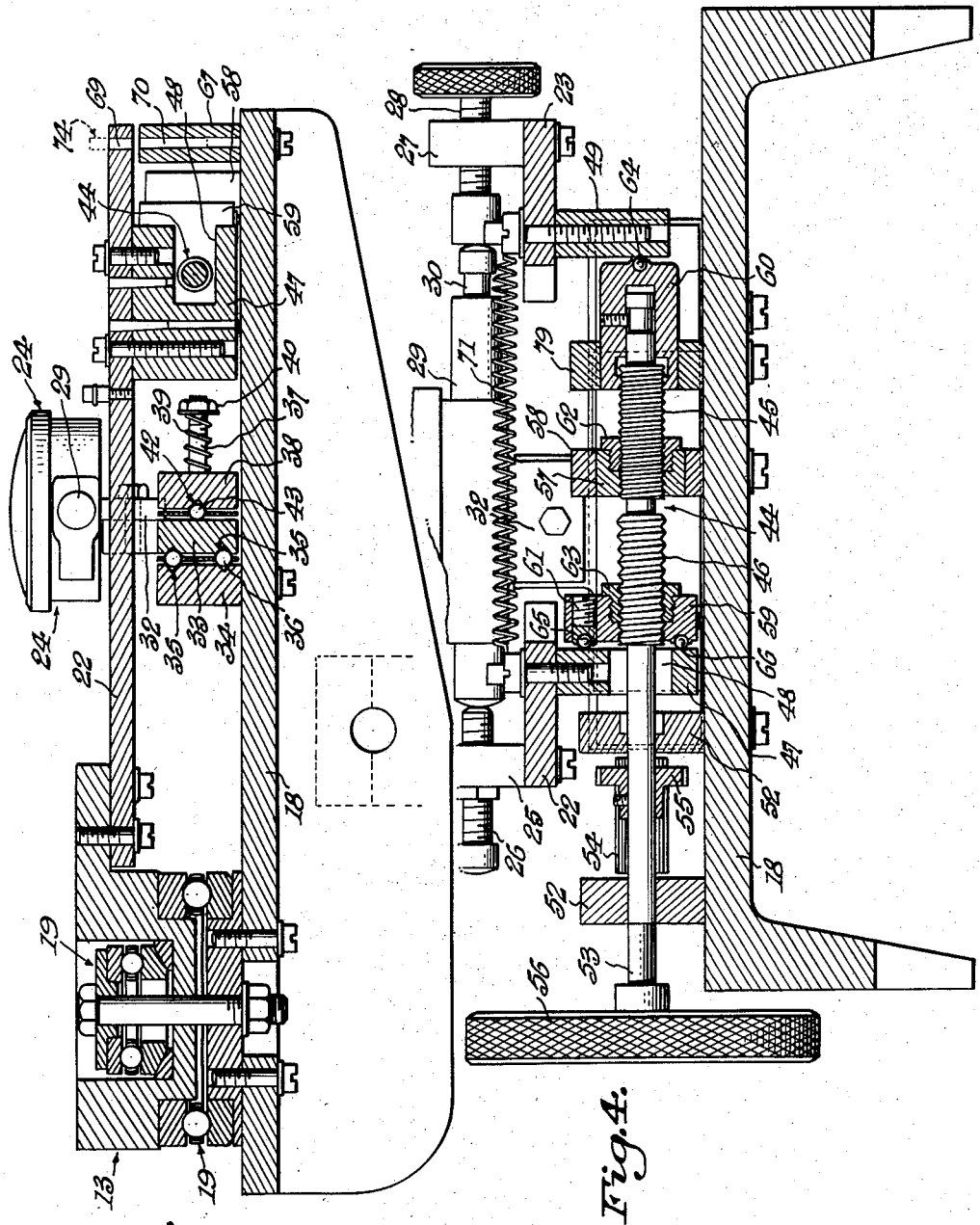

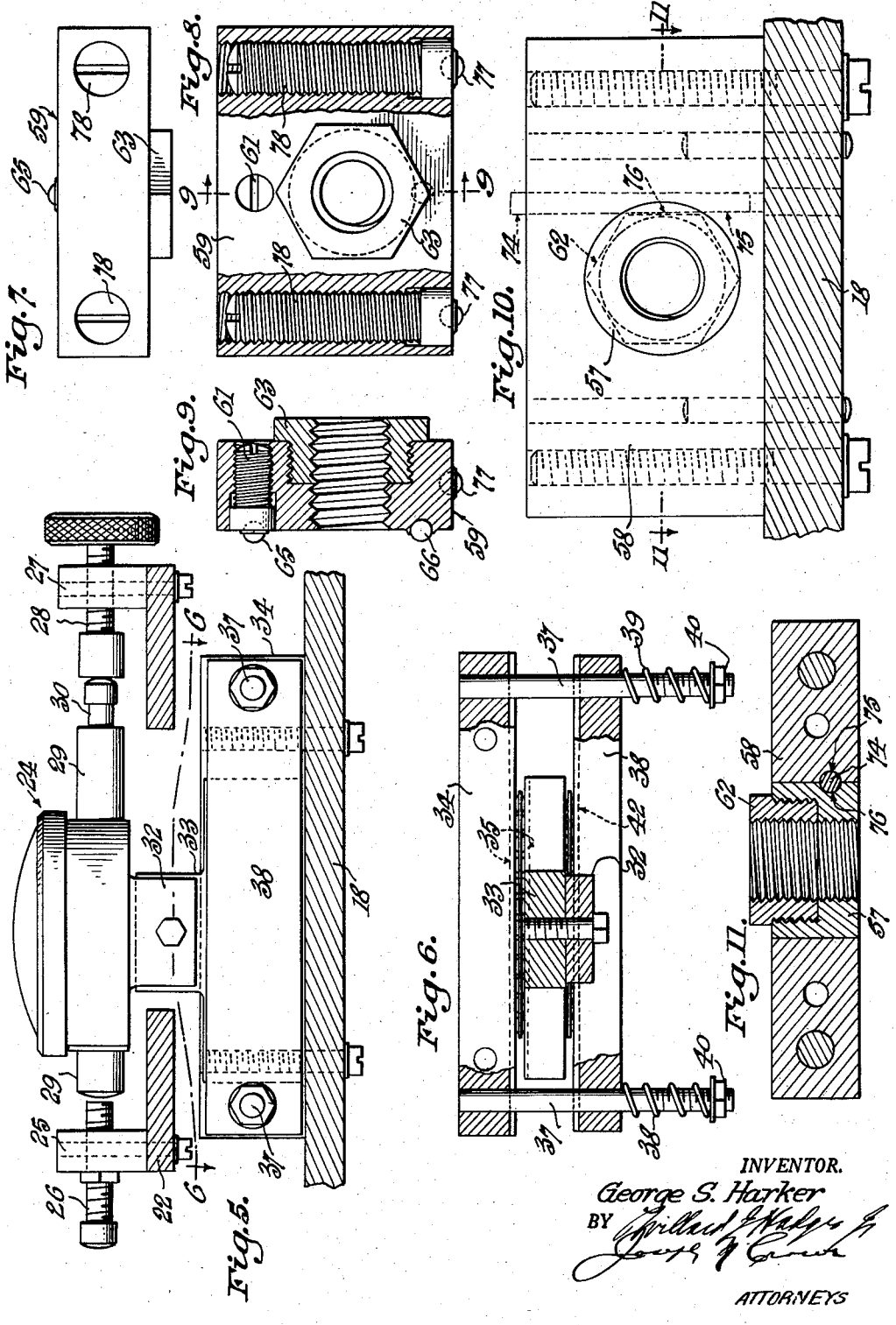

United States Patent Office 2,859,657
Patented Nov. 11, 1958

2,859,657

STEREOPTOMETER

George S. Harker, Valley Station, Ky.

Application August 28, 1956, Serial No. 606,787

8 Claims. (Cl. 88—20)

(Granted under Title 35, U. S. Code (1952), sec. 266)

The invention described herein may be manufactured and used by or for the Government for governmental purposes without the payment of any royalty thereon.

The present invention relates to stereoptometers and more particularly to haploscopic instruments for the precise measurement of the convergence angle in binocular vision.

The present invention provides a novel drive means which makes possible the construction of a stereoptometer which will provide all three visual conditions of asymmetrical right, asymmetrical left, and symmetrical vergence in one precision instrument and which will yield the same change of vergence angle for equal amounts of actuation of a control means regardless of which of the three visual conditions the instrument is set to provide. This invention also makes possible the measurement of the amount of vergence recorded on the instrument by the use of one measuring means employing only one scale for measurement regardless of whether the instrument is set to provide the visual condition of asymmetrical right, asymmetrical left, or symmetrical vergence. Thus, readings or measurements taken under any of the three visual conditions are directly comparable.

It is an object of the present invention to provide means for projecting a reticle image into each eye of an observer to yield a test object manipulatable in depth by changing the angle of vergence between parallel beams of light emanating from a pair of reflex sight assemblies.

It is another object of the present invention to provide a stereoptometer amenable to precise laboratory manipulation which incorporates the visual task of a stereoscopic range finder.

Another object of the present invention is to provide means for precisely measuring the angle of vergence under the three visual conditions of asymmetrical right, asymmetrical left, and symmetrical vergence.

Another object of the present invention is to provide means to yield the same amount of change of vergence angle for each rotation of a control knob for all three visual conditions of asymmetrical right, asymmetrical left, and symmetrical vergence to provide the same kinesthetic feel for the operator in all three conditions.

Another object of the present invention is to provide a stereoptometer having a single scale factor for the measurement of the angle of vergence making readings for all three conditions of asymmetrical right, asymmetrical left, and symmetrical vergence directly comparable.

A further object of the present invention is to provide a stereoptometer having means within its drive screw assembly to provide control of drive screw play and thus eliminate lateral weave or slap of the test object.

A still further object of the present invention is to provide means to assure independence of the arms which control rotation of the reflex sight assemblies being affected by elements of the drive screw assembly used to impart force to the control arms.

Broadly described, the present invention comprises a stereoptometer including reflex sight means to project a reticle image into each eye of an observer; these reticle images are presented separately to the two eyes and fused in the observer's field of vision so that the observer experiences the two reticle images as one test object fixed at a certain depth from the observer. Means are provided to make the test object manipulatable in depth by the observer, and the depth adjustment of the test object is effected by changing the angle of vergence between parallel beams of light from the reflex sight means. The invention also embodies means for controlling the angle of vergence and the depth of the test object which provide the same kinesthetic feel for the operator for the three visual conditions of asymmetrical right, asymmetrical left, and symmetrical vergence and means to directly measure the angle of vergence using the same scale factor for all three visual conditions.

Further objects and a more thorough understanding of the invention may be obtained by referring to the following description and claims, taken in conjunction with the accompanying drawings which disclose an illustrative embodiment of the construction forming the basis of the invention and in which—

Fig. 1 is a side elevation of the stereoptometer showing an observer's head in broken lines;

Fig. 3 is a longitudinal section taken on the line 3—3 of Fig. 2;

Fig. 4 is a transverse section taken on the line 4—4 of Fig. 2;

Fig. 5 is a transverse section taken on the line 5—5 of Fig. 2;

Fig. 6 is a horizontal section taken on the line 6—6 of Fig. 5;

Fig. 7 is a plan view of the drive nut of the drive screw assembly;

Fig. 8 is a side elevation of the drive nut partially shown in section;

Fig. 9 is a vertical section taken on the line 9—9 of Fig. 8;

Fig. 10 is a side elevation of the reference nut and collar;

Fig. 11 is a horizontal section taken on the line 11—11 of Fig. 10; and

Fig. 12 is a detailed vertical section taken on the line 12—12 of Fig. 2.

Figure 2:
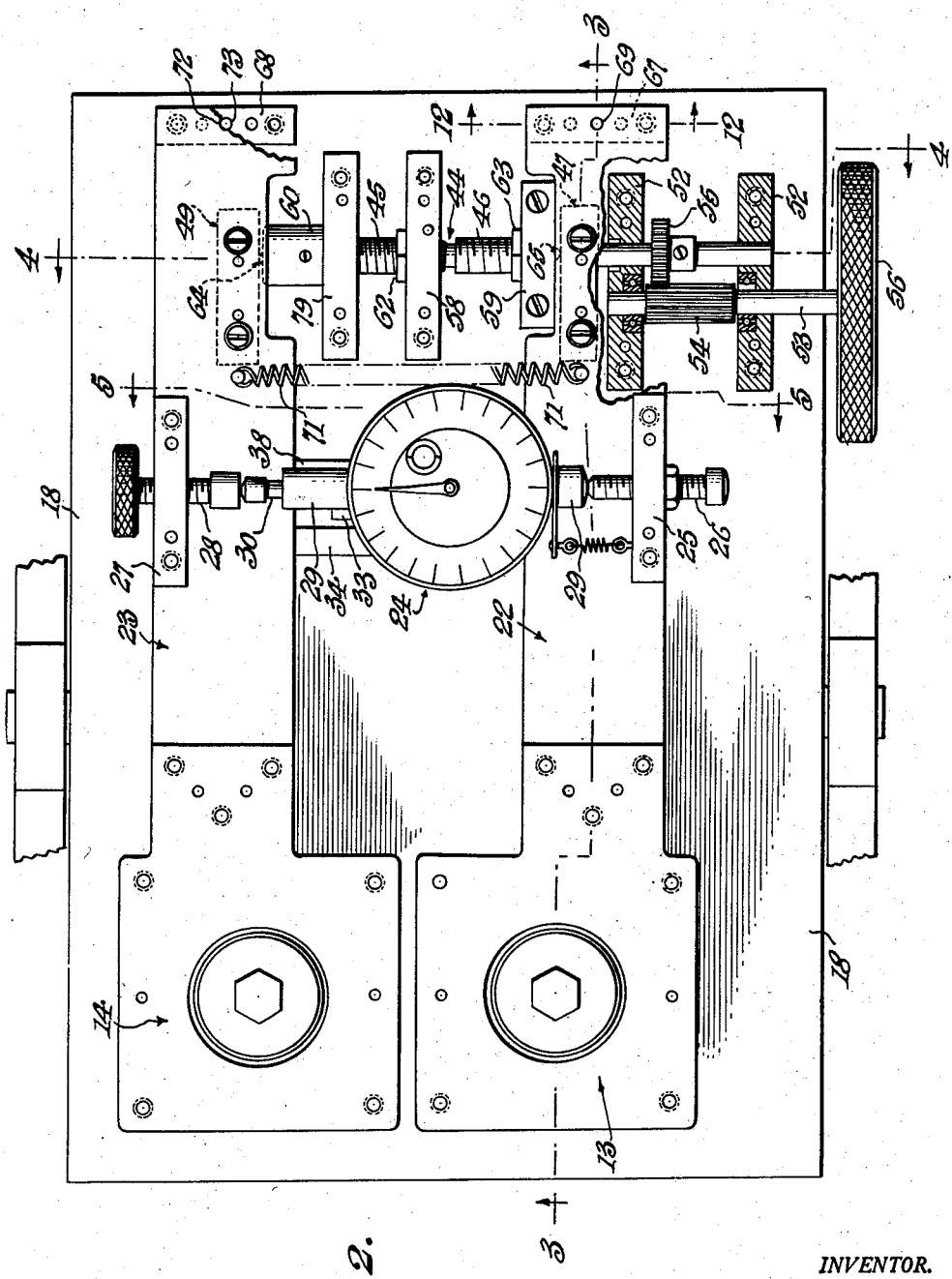
Fig. 2 is an enlarged plan view of the stereoptometer.

In accordance with the invention, means are provided for projecting a reticle image into each eye of the observer, means for rotatably supporting the image projecting means on a base, and means for controlling the degree of rotation of each image projecting means.

In the illustrated embodiment of the invention (Fig. 1), the means for projecting a reticle image into each eye of an observer comprises a right reflex sight assembly 13 and a left reflex sight assembly 14; each of the reflex sight assemblies 13 and 14 in turn comprises a light source 15 (not shown in detail), a reticle (not shown in detail), a lens 16, and a reflection plate 17. The reticle may be designed to project into the observer's eye an image of almost any desired configuration, such as, a star point or a cross. The two reflex sight assemblies 13 and 14 are rotatably supported upon a base 18 by a pair of ball thrust bearings 19, and the base 18 is in turn rotatably supported upon a pedestal 20. The means for controlling the degree of rotation of reflex sight assemblies 13 and 14 comprises a right control arm 22 (Fig. 2) which is secured to the right reflex sight assembly 13 and a left control arm 23 which is secured to the left reflex sight assembly 14.

In conformance with the invention, means are provided to selectively move the control arms 22 and 23 to change the angle of vergence between the images projected by the two reflex sight assemblies 13 and 14, and means are provided to measure the distance between the control arms.

As embodied, the means for measuring the distance between the two control arms 22 and 23 comprises a dial type measuring gauge 24 (Figs. 2 and 5) which has a single scale factor for all conditions of vergence of the instrument. The right control arm 22 is provided with an upstanding member 25 which is threaded to receive an adjusting screw 26, and the left control arm 23 is similarly provided with an upstanding member 27 which is threaded to receive a second adjusting screw 28. The measuring gauge 24 comprises a body 29 and a movable plunger 30 which may be slidably moved in relation to the body 29 to actuate the gauge. The adjusting screw 26 is in contact with the body 29 of the measuring gauge 24 and the adjusting screw 28 is in contact with the movable plunger 30. This manner of placement of the measuring gauge 24 requires that it be slidably mounted relative to the base in order to permit its body 29 as well as its movable plunger 30 to move, the body 29 in response to movement of the right control arm 22 and the movable plunger 30 in response to movement of the left control arm 23.

The means provided to slidably or movably support the body 29 on the base 18 comprises a flange 32 which depends from the body 29 of the measuring gauge and to which is secured a center slide 33. A bearing block 34 is firmly attached to the base 18 so that it lies adjacent to the center slide 33. Ball races 35 are provided in the bearing block 34 and in the center slide 33 to receive ball bearings 36 to permit sliding movement between the center slide 33 and bearing block 34. At each end the bearing block 34 is provided with a guide rod 37 to receive for sliding movement a tension bar 38, the guide rods 37 being supplied with coil springs 39 and adjusting nuts 40 to hold the tension bar 38 in close proximity to the center slide 33. The tension bar 38 is provided with a ball race 42 and ball bearings 43 to permit sliding movement between it and the center slide 33. It is apparent from the structure just recited that the measuring gauge 24 provides a measure of the distance between the two control arms 22 and 23 rather than the distance from either arm to some arbitrary reference point. This feature makes possible the direct comparison of measurements taken under asymmetrical right, asymmetrical left, or symmetrical vergence without the necessity of making any scale conversions.

As embodied, the means for controlling movement of the control arms 22 and 23 comprises a drive screw assembly (Figs. 2 and 4). This drive screw assembly in turn comprises a dual thread drive screw shaft 44 having a fine thread 45 and a coarse thread 46. The right control arm 22 is provided with a depending contact block 47 which is in turn provided with a slot 48 to accommodate the drive screw shaft 44, and the left control arm 23 is similarly provided with a depending contact block 49. The base 18 supports bearing blocks 52 in which are mounted the drive screw shaft 44 and a drive shaft 53 which has secured to it an elongated gear 54 meshing with a pinion 55 secured to the drive screw shaft 44. A knurled control knob 56 is secured to the drive shaft 53 for imparting rotation to the drive screw shaft 44 through the elongated gear 54 and pinion 55. This gearing arrangement permits the drive screw shaft 44 to move from right to left or the reverse while the control knob 56 remains stationary.

The drive screw assembly further comprises a reference nut 57 (Figs. 10 and 11) threadedly engaged with the fine thread 45 of the drive screw shaft 44, a reference nut bearing 58, a drive nut 59 (Figs. 7, 8, and 9) threadedly engaged with the coarse thread 46, and an end cap 60 which is adjustably mounted on the end of the drive screw shaft 44. In the present preferred embodiment of the invention the pitch of the fine thread 45 is exactly twice the pitch of the coarse thread 46. It is this two-to-one thread ratio of the fine thread 45 to the coarse thread 46 which makes possible the obtaining of an equal change in the angle of vergence for each rotation of the drive screw shaft 44 for all three visual conditions of asymmetrical right, asymmetrical left, and symmetrical vergence, and gives the operator the same kinesthetic feel in manipulating the control knob 56 regardless of which visual condition is set on the instrument. It is not the intention of the inventor, however, to restrict the invention to the teaching of a two-to-one thread ratio for the drive screw shaft 44, as it is obvious that proper choice of thread ratios could produce any desired movement relationship between a drive nut and drive screw in a combination comprising the basic drive screw assembly which is taught by the present disclosure.

The reference nut 57 is provided with a reference lock nut 62 which gives an adjustable means to control play in the drive screw shaft 44 which would otherwise be seen by an observer as weave in the projected visual display when the direction of rotation of the drive screw shaft 44 is reversed. Of course, the reference lock nut 62 may also be used to accommodate initial tolerance in machining and subsequent wear of parts. Similarly, drive nut 59 is provided with a drive lock nut 63 for purposes and functions identical to those just described for the reference lock nut 62 above. Independence of the drive screw assembly from the control arms 22 and 23 is obtained through the use of a contact ball bearing 64 in the end cap 60, which is in direct contact with the depending contact block 49 which in turn is secured to the left control arm 23, and an upper contact ball bearing 65 and lower contact ball bearing 66, both of which are in the end of the drive nut 59 (Figs. 7, 8, and 9) and in direct contact with the depending contact block 47 attached to the right control arm 22. The upper contact bearing 65 in the drive nut 59 is provided with an adjusting screw 61 as an aid to precise calibration of the instrument. The instrument is provided with a coiled helical spring 71 having one end secured to the right control arm 22 and the other end to the left control arm 23. This spring 71 serves to hold the depending contact blocks 47 and 49 tightly against the contact bearings 65, 66, and 64 and to hold the adjusting screws 26 and 28 in continuous contact with the body 29 and movable plunger 30 of the measuring gauge 24.

A right pin block 67 is supported on the base 18 beneath the outer extremity of the right control arm 22, and a left pin block 68 is mounted on the base 18 at the outer extremity of the left control arm 23. The right control arm is provided with a centrally located right aperture 69 directly above a corresponding aperture 70 in the right pin block 67 (Fig. 12). Similarly, the left control arm is provided with a left aperture 72 and the left pin block 68 with a corresponding aperture 73. The right control arm 22 may be pinned to the right pin block 67 as a reference point for movement and measurement of asymmetrical left vergence by the insertion of a taper pin lock 74 in apertures 69 and 70. Similarly, the left control arm 23 may also be pinned to the left pin block 68 as a reference point for movement and measurement of asymmetrical right vergence by insertion of the taper pin lock 74 into the apertures 72 and 73.

An important characteristic of the functioning of the drive screw assembly is made possible through the employment of the reference nut assembly (Figs. 10 and 11) which comprises the reference nut proper 57 and the reference nut bearing 58. The reference nut 57 cooperates with the fine thread 45 of the drive screw shaft 44 when the operator desires to obtain the condition of symmetrical vergence. The reference nut bearing 58 which is fastened firmly to the base 18 is provided with an aperture 75 into which the taper pin lock 74 may be inserted to lock the reference nut 57 in a fixed position with respect to the reference nut bearing 58 by means of a straight groove 76 in the reference nut (Figs. 10 and 11). When the reference nut 57 is pinned in the reference nut bearing 58 the fine thread 45 of the drive screw shaft 44 cooperates with the reference nut 57 to produce the condition of symmetrical vergence. Thus, counterclockwise rotation of the drive screw shaft 44 causes the shaft to advance from right to left at the pitch of the fine thread 45. This same rotation causes the drive nut 59 to move from left to right with respect to the drive screw shaft 44 at the pitch of the coarse thread 46. In order to permit the drive nut 59 to move freely across the flat surface of the base 18, it is equipped with contact ball bearings 77 on its lower surface, and each contact bearing 77 is provided with an adjusting screw 78. The difference between the pitch of the fine thread 45 and the coarse thread 46, i. e., the two-to-one thread ratio, causes the end cap 60 of the drive screw shaft 44 and the drive nut 59 each to move outward from or inward toward the reference nut bearing 58 at the pitch of the fine thread 45. This principle of movement subtraction provides the condition of symmetrical vergence desired in the instrument, i. e., both reflex sight assemblies 13 and 14 are rotated an equal amount but in opposite directions of rotation as the right and left control arms 22 and 23 move away from or toward the reference nut bearing 58 as a reference point at equal rates of travel, viz., at the pitch of the fine thread 45. Of course, any desired movement relationship between a drive nut and drive screw shaft could be obtained through a proper choice of thread ratios.

It is now apparent that in operation if the right control arm 22 is pinned through the apertures 69 and 70, rotation of the drive screw shaft 44 will move the left control arm 23 away from or toward the right arm 22, as a reference point, at the pitch of the coarse thread 46. Also, if the left control arm 23 is pinned through the apertures 72 and 73, rotation of the drive screw shaft 44 will cause the drive nut 59 to move the right control arm 22 away from or toward the left control arm 23, as a reference point, at the pitch of the coarse thread 46. Thus, the same rate of change of the angle of vergence is obtained regardless of whether the visual condition of symmetrical vergence (reference nut 57 pinned in reference nut bearing 58), asymmetrical right vergence (left control arm 23 pinned to left pin block 68), or asymmetrical left vergence (right control arm 22 pinned to right pin block 67) is being used.

By the choice of proper material for the drive screw shaft 44, reference nut bearing 58, reference nut 57, and reference lock nut 62, greater bimetal friction can be obtained between the drive screw and the reference nut than exists between the reference nut 57 and the reference nut bearing 58. If such a frictional relation is obtained, the reference nut 57 will turn freely in the reference nut bearing 58 when the taper pin lock 74 is removed. Thus, with the pin lock 74 removed the exterior surface of the reference nut 57 moves within the interior surface of the reference nut bearing 58 permitting the bearing 58 to act as an aligning means for the entire drive screw shaft 44. The frictional relation which is maintained also provides for facility in repositioning the reference nut 57 within the reference nut bearing 58 when the instrument is changed from asymmetrical to symmetrical vergence. An end bearing 79 similar to the reference nut bearing 58 supports the end cap 60 of the drive screw shaft 44 and in cooperation with the reference nut bearing 58 serves as an additional aligning means for the drive screw shaft 44.

In operation, the reflex sight assemblies 13 and 14 are used to project a star point, or other suitable reticle image, into each eye of an observer without the interposition of any optical aids other than spectacles, if required, between the observer and the field of view. The reticle images thus presented separately to the two eyes of the observer can be fused by him and experienced in his field of view as a test object manipulatable in depth. The depth adjustment is effected by changing the angle of vergence between the parallel beams of light from the reflex sights. Characteristic of images carried by parallel beams, lateral displacement of the observing eye results in a like displacement of the reticle image; lateral rotation of the observing eye results in a contrary displacement of the reticle image. The first of these characteristics of parallel beams makes unnecessary an adjustment for interpupilary distance when two beams of sufficient width are used. The second of these characteristics makes possible the act of ranging, i. e., measurement of the vergence of the eyes in setting the simulated test object to apparent depth equality with an object in the field of view. Such measurement is possible even though the axes of rotation of the reflex sights do not coincide with those of the eyes of the observer, since parallel lines form equal angles with transverse parallels.

The data obtained from the stereoptometer of the present invention provide two measures: (1) a spatial localization measure—the mean dial reading on the measuring guage 24; and (2) a stereoptic acuity measure—the variability of the dial reading on the measuring gauge 24. The appropriate expression of these measures will depend upon whether the instrument is observer or experimenter operated, and whether the data are transformed from angular measure to linear measure. Consistent with the approach used, the observer's task may be to place the test object at the same time distance from himself as a reference object; or to make judgments of the depth position of the test object with respect to the reference object as the experimenter adjusts the instrument and exposes the test object for timed intervals. The variables that may be studied in the target field are limited only by the experimenter's ingenuity in manipulation of the environment. With reticle brightness control and a selection of neutral density fillers for the reflection plate 17, the test object may be projected by the observer into almost any field of view which one would care to consider. The instrument can be used to investigate the depth dimensions of real terrain under field conditions or of simulated scenes projected from stereoscopic slides under reduced stimuli and illusion situations in a laboratory.

The present invention makes possible the obtaining of the condition of symmetrical vergence which offers a unique test of binocular vision. A report by the observer of left or right movement in the test object is referable to suppression of vision in a specific eye, a report of radial movement is referable to binocular vision, and fusion limits may be explored through the report of doubling of the test object image.

The present invention, primarily through the use of its novel drive screw assembly, provides a precision instrument for the measurement of all three visual conditions of asymmetrical right, asymmetrical left, and symmetrical vergence on one instrument which yields the same change of vergence angle for all three visual conditions for equal amounts of rotation of a control knob 56. The unusual construction of the drive screw assembly also makes possible the employment of a measuring gauge 24 positioned between the two control arms 22 and 23 to measure the vergence angle under all three visual conditions with the use of a single scale factor, thus making the readings for all three conditions directly comparable.

Having thus described my invention, what I claim as new and wish to secure by Letters Patent is:

1. A stereoptometer comprising a base, a pair of reflex sight assemblies rotatably supported on the base, a pair of control arms, each reflex sight assembly having a control arm associated with it, means for measuring the distance between the control arms, a drive screw having a driving end and a driven end, both the driving end and the driven end being rotatably supported by the base, the drive screw having two threads of different pitch, a drive nut cooperating with one thread and fixed against rotation with respect to the base but free to travel across its surface, a reference nut cooperating with the other thread, means for locking the reference nut against rotation with respect to the base, means for holding one control arm against the drive nut, means for holding the other control arm against the driven end of the drive screw, and means for locking each of the control arms to the base.

2. A stereoptometer comprising a base, a pair of reflex sight assemblies rotatably supported on the base, a pair of control arms, each reflex sight assembly having a control arm associated with it, means for measuring the distance between the control arms, a drive screw having a driving end and a driven end, both the driving end and the driven end being rotatably supported by the base, the drive screw having a fine thread adjacent to its driven end and a coarse thread adjacent to its driving end, a drive nut cooperating with the coarse thread and fixed against rotation with respect to the base but free to travel across its surface, a reference nut cooperating with the fine thread, means for locking the reference nut against rotation with respect to the base, means for holding one control arm against the drive nut, means for holding the other control arm against the driven end of the drive screw, and means for locking each of the control arms to the base.

3. A stereoptometer comprising a base, a pair of reflex sight assemblies rotatably supported on the base, a pair of control arms, each reflex sight assembly having a control arm attached to it, means for measuring the distance between the control arms, a drive screw having a driving end and a driven end, both the driving end and the driven end being rotatably supported by the base, the drive screw having a fine thread adjacent to its driven end and a coarse thread adjacent to its driving end, the fine thread having a pitch twice as great as the coarse thread, a drive nut cooperating with the coarse thread and fixed against rotation with respect to the base but free to travel across its surface, a reference nut cooperating with the fine thread, means for locking the reference nut against rotation with respect to the base, means for holding one control arm against the drive nut, means for holding the other control arm against the driven end of the drive screw, and means for locking each of the control arms to the base.

4. A stereoptometer comprising a base, a pair of reflex assemblies rotatably supported on the base, a pair of control arms, each reflex sight assembly having a control arm attached to it, a measuring gauge positioned between the control arms, the measuring gauge having a body and a movable plunger, the plunger being slidable relative to the body to actuate the gauge, the body of the gauge being slidably mounted on the base to permit movement of the body relative to the base, a drive screw having a driving end and a driven end, both the driving end and the driven end being rotatably supported by the base, the drive screw having two threads of different pitch, a drive nut cooperating with one thread and fixed against rotation with respect to the base but free to travel across its surface, a reference nut cooperating with the other thread, means for locking the reference nut against rotation with respect to the base, means for holding one control arm in contact with the drive nut, means for holding the other control arm in contact with the driven end of the drive screw, and means for locking each of the control arms to the base.

5. A stereoptometer comprising a base, a pair of reflex sights rotatably supported on the base, a pair of control arms, each reflex sight having a control arm associated with it, a measuring gauge positioned between the control arms, the measuring gauge having a plunger and a body, the plunger being slidable relative to the body to actuate the gauge, the body of the gauge being slidably mounted on the base to permit movement of the body relative to the base, a drive screw rotatably supported on the base and having two threads of different pitch, a drive nut cooperating with one thread, a reference nut cooperating with the other thread, means for locking the reference nut to the base, the drive screw having a driving end and driven end, means tending to draw the control arms towards each other to hold one control arm against the driven end of the drive screw and the other control arm against the drive nut, and means to lock each control arm to the base.

6. A stereoptometer comprising a base, a pair of reflex sights rotatably supported on the base, a pair of control arms, each reflex sight having a control arm associated with it, a measuring gauge positioned between the control arms, the measuring gauge having a plunger and a body, the plunger being slidable relative to the body to actuate the gauge, the body of the gauge being slidably mounted on the base to permit movement of the body relative to the base, a drive screw having a fine thread and a coarse thread positioned between the control arms and rotatably supported by the base, the fine thread having a pitch twice as great as the coarse thread, a drive nut cooperating with the coarse thread, a reference nut cooperating with the fine thread, means to lock the reference nut relative to the base, means to lock each control arm relative to the base, the drive screw having a driving end and a driven end, the driven end being adjacent to the fine thread of the drive screw, the coarse thread being adjacent to the driving end, means for holding one control arm against the driven end of the drive screw and the other control arm against the drive nut, and means for locking each control arm to the base.

7. A stereoptometer comprising a base; a pair of reflex sight assemblies rotatably supported on the base; each reflex sight assembly embodying a light source, a reticle, a lens, and a reflection plate; a pair of control arms, each reflex sight assembly having a control arm associated with it; a measuring gauge positioned between the control arms, the measuring gauge having a plunger and a body, the plunger being slidable relative to the body to actuate the gauge, the body of the gauge being slidably mounted on the base to permit movement of the body relative to the base; a drive screw positioned between the control arms and having two threads of different pitch, a drive nut cooperating with one thread, a reference nut cooperating with the other thread, means to lock the reference nut relative to the base, means to lock each control arm relative to the base, the drive screw having a driving end and a driven end and each end being rotatably supported by the base, and means to hold one control arm against the driven end of the drive screw and the other control arm against the drive nut.

8. A stereoptometer comprising a base; a pair of reflex sight assemblies rotatably supported on the base; each reflex sight assembly including a light source, a reticle, a lens and a reflection plate; a pair of control arms, each reflex sight assembly having one of the control arms associated with it; a measuring gauge positioned between the control arms, the measuring gauge having a plunger and a body, the plunger being slidable relative to the body to actuate the gauge, the body of the measuring gauge being slidably mounted on the base to permit movement of the body relative to the base; a drive screw having a fine thread and a course thread positioned between the control arms and rotatably supported on the base, the fine thread having a pitch twice as great as the coarse thread, a drive nut cooperating with the coarse thread, a reference nut cooperating with the fine thread, means to lock the reference nut relative to the base, means to lock one control arm to the base, means to lock the other control arm to the base, the drive screw having a driving end and a driven end, the driven end being adjacent to the fine thread of the drive screw, the drive nut being adjacent to the driving end, and means for holding one control arm against the driven end of the drive screw and the other control arm against the drive nut.

References Cited in the file of this patent

UNITED STATES PATENTS

| | | |
|---|---|---|
| 2,081,969 | Allen et al. | June 1, 1937 |
| 2,389,155 | Kerry | Nov. 20, 1945 |
| 2,481,129 | Le Lourneau | Sept. 6, 1949 |
| 2,703,498 | Tree | Mar. 8, 1955 |